Patented Jan. 23, 1923.

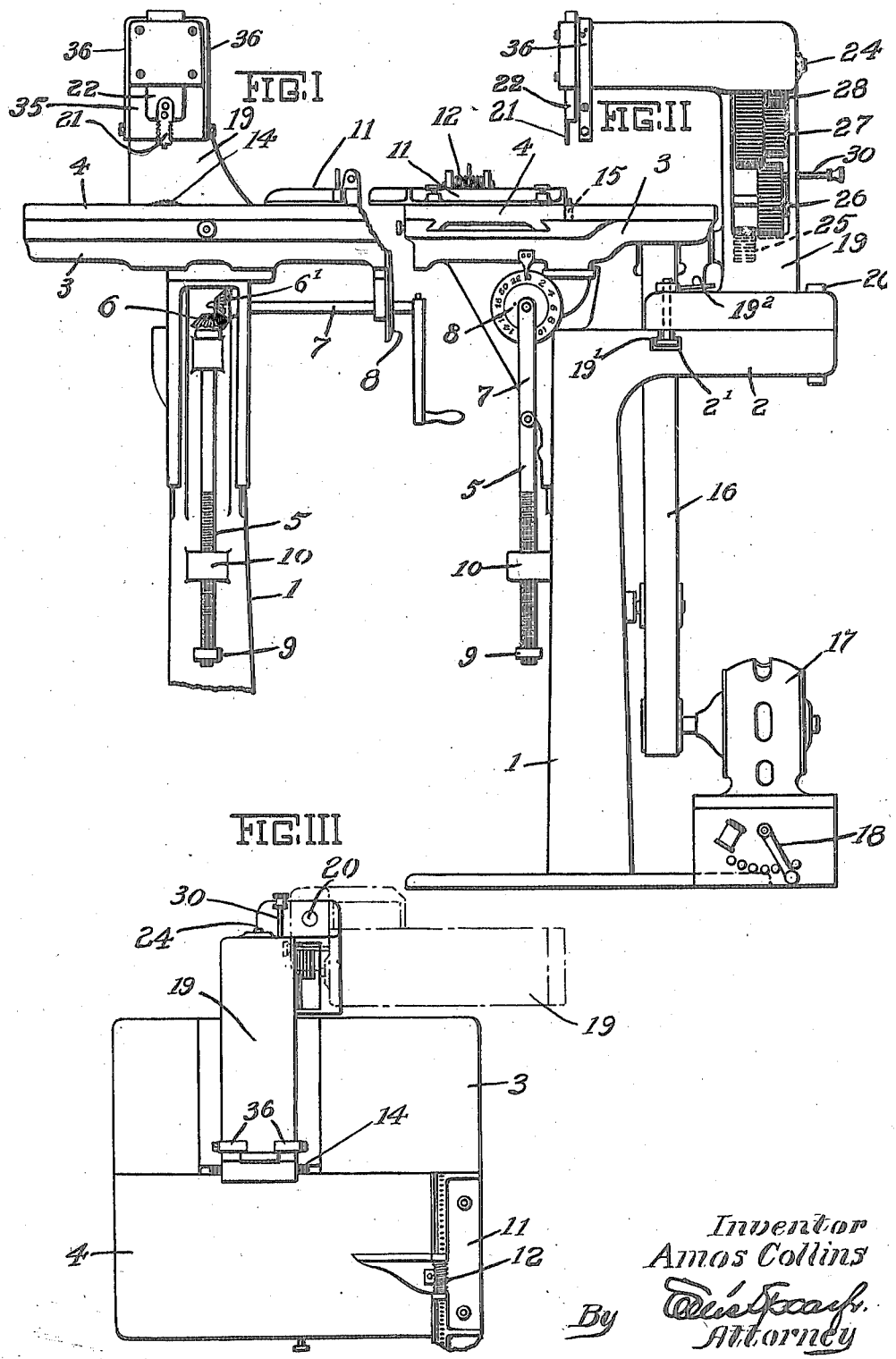

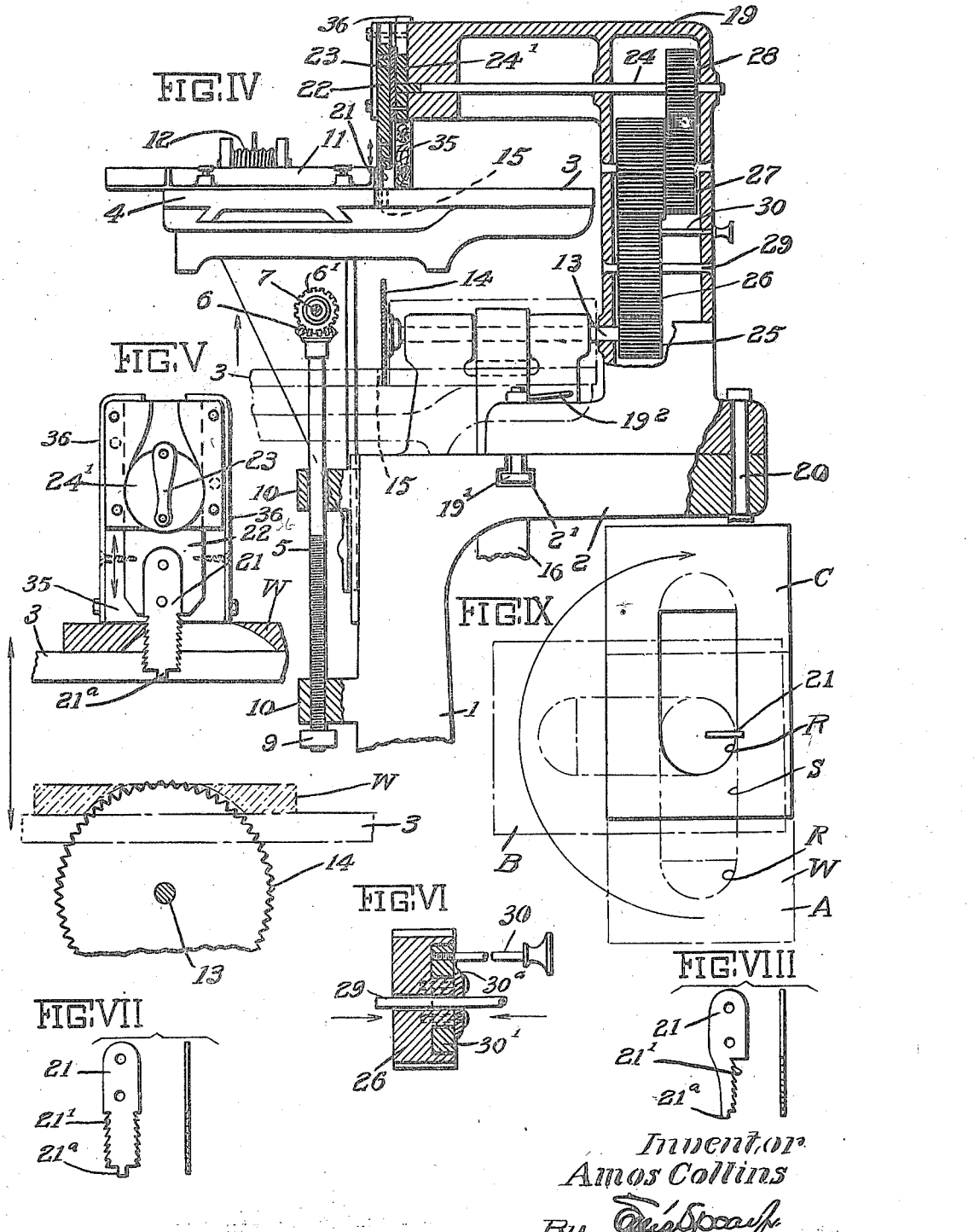

1,443,008

UNITED STATES PATENT OFFICE.

AMOS COLLINS, OF CANTON, MASSACHUSETTS, ASSIGNOR OF ONE-HALF TO HIMSELF AND ONE-HALF TO CHARLES H. TAYLOR, JR., OF BOSTON, MASSACHUSETTS.

ATTACHMENT FOR SAW TRIMMERS.

Application filed May 11, 1920. Serial No. 380,437.

*To all whom it may concern:*

Be it known that I, AMOS COLLINS, a citizen of the United States, residing at Canton, county of Norfolk, Commonwealth of Massachusetts, have invented certain new and useful Improvements in Attachments for Saw Trimmers, of which the following is a specification.

This invention relates to a machine for cutting in one or more directions from an opening already made in a piece of work, and is particularly intended for use in the composing and stereotype rooms of printing shops. In such situations it is frequently necessary to cut square corners and irregular shapes from the opening already made in the work. Heretofore this has involved transferring the work to a jig saw and adjusting the jig saw for the particular cut to be made.

In its broadest aspect, my invention consists of an organized unitary machine for making such cuts from the opening already made in the work, regardless of the means by which said preliminary opening was made. While capable of such independent use, my invention may be conveniently combined with the machine for making the preliminary opening in the work. Such machine may be a usual saw trimmer of standard type and accordingly for the sake of clearness of treatment I shall show and describe my invention in its application to a saw trimmer, although it will be understood that such showing is purely illustrative and in no way limiting. When so combined my invention considerably enlarges the field of utility of the saw trimmer in that it enables certain classes of work which cannot now be performed with the ordinary saw trimmer, particularly such work as is now done with a jig saw, to be performed at such machine.

Specifically, my invention consists in the novel construction and combination and relation of parts described and illustrated in the accompanying specification and drawings, and particularly pointed out in the appended claims. Throughout the specifications and drawings like reference characters are correspondingly applied, and in the drawings.

Fig. I is a partial front elevation of the saw trimmer of standard type equipped with my invention.

Fig. II is a side view thereof.

Fig. III is a plan view indicating in dotted lines the reciprocating tool swung into inoperative position.

Fig. IV is a detail section through the machine and indicating in full and dotted lines different positions of the work table.

Fig. V is the face view of the reciprocating tool with cover plate removed and indicating the use of the tool.

Fig. VI is a detailed section illustrating the sliding gear for coupling the shaft for the reciprocating tool to the spindle for the circular saw.

Fig. VII is a detail view of the reciprocating tool removed.

Fig. VIII is a similar view of a modified form of reciprocating tool.

Fig. IX is a somewhat diagrammatical view illustrating the manner of use of the modification shown in Fig. VIII.

I have indicated at 1 the supporting column of a saw trimmer of standard type and at 2 the bed thereof which is provided with an elevating mechanism whereby the main table 3 and sliding table 4 may be vertically adjusted. The table elevating mechanism consists of a screw 5 which is geared at 6—6' to an operating crank 7. The vertical adjustment of the main table is gauged by means of a micrometer point dial 8 and the screw 5 is provided with an adjustable stop 9 adapted to contact one of the bearings 10 for the screw to limit the upward movement of the table.

The sliding table 4 operates transversely of the machine and is equipped with a pica swivel gauge 11 and a micrometer point end gauge 12. By operation of these several gauges any vertical or lateral cut required may be performed with absolute accuracy.

Journaled in suitable bearings in the head 2 of the machine is a horizontal saw spindle 13 having at its forward end a circular saw 14 which operates through a transverse slot 15 in the saw table 3. The saw spindle is rotated by means of a belt 16 driven from a motor 17 and as here shown provided with a control lever 18, whereby the motor may be started and stopped by the foot of the operator.

The reciprocating tool is mounted in a head 19 which is swiveled at 20 to the bed 2 of the machine for a movement into and out of operative relation to the circular saw 14, as indicated in full and dotted lines Fig.

III. The head is locked in operative position by a cam locking bolt 19' adapted to enter within a locking recess 2' in the bed 2, see Fig. II, and provided with an operating portion 19². The reciprocating tool is indicated at 21 and is adapted to be reciprocated vertically relative to the circular saw 14 with which it normally alines when in operative position. Such tool is preferably a double faced saw blade, but may be a single-faced blade or a broach or other cutter. The reciprocating tool 21 is mounted in a carrier 22 fast to the forward end of the head 19 and is adapted to be coupled with and driven from the saw spindle 13 through a reducing gear train and crank shaft. The connection is indicated at 23 and is a simple link pivoted at one of its ends to the headed end 24' of the spindle 24 and pivoted at its other end to the carrier 22 for the reciprocating tool 21.

The drive from the saw spindle 13 to the spindle 24 is through a pinion 25 fast on the saw spindle 13, adapted to mesh with said pinion 25, a sliding gear 26, a compound gear 27 meshing with the gear 26, and a pinion 28 fast on the spindle 24 and meshing with the compound gear 27 said gear train being enclosed within the hollow head 19. By this construction the spindle 24 may be coupled to from the saw spindle 13 whenever desired by simply sliding the gear 26 into and out of mesh with the pinion 25 on the saw spindle. See Fig. IV. To this end the gear 26 is slidable on a bearing 29 fast in the side walls of the hollow head 19 and is provided with a pull stem 30 by means of which the gear may be slid along said bearing 29 into and out of mesh with the pinion 25. As here shown, the stem 30 is screwed into a ring 30' clamped in an annular recess formed in the outer face of the gear 26 by a collar 30ª screwed to said gear. See Fig. VI.

The reciprocating tool 21 detailed in Fig. VII is provided with cutting teeth 21' along each longitudinal edge thereof and with a central indexing pointer 21ª which constitutes a gauge for the work as it is moved relative to the tool. The reciprocating tool detailed in Fig. VIII is similarly provided with an axial gauging point 21ª but has only one row of cutting teeth 21'.

I have indicated in Fig. V the combinative relation of the circular saw and reciprocating tool in the formation of an undercut and mortise in a piece of work W. In this figure the circular saw has made a cut from below in the work and the saw table 3 has been elevated to bring the work within the influence of the reciprocating tool which is shown as operating in the undercut produced by the circular saw.

In Fig. IX I have indicated somewhat diagrammatically the operation of the modified form of reciprocating tool detailed in Fig. VIII. In this figure the work W which has already been slotted as indicated at S is adapted to be turned relative to the reciprocating tool 21 as indicated by the arrow, to produce the radius cut indicated at R. The several successive positions of the work relative to the reciprocating tool 21 are indicated at A B and C.

In both forms it will be noted that the reciprocating tool is secured at one end only to the carrier 22 which is reciprocated from the spindle 24. This construction is of decided advantage over such broaching attachments as have heretofore been devised in which the reciprocating tool is secured at each end in the manner of the ordinary jig saw blade.

Another feature of advantage in my present machine consists in the arrangement for preventing up and down movement of the work W while the reciprocating tool is operating. To this end I mount a block 35 on the horizontal portion of the head 19 parallel to the plane of the reciprocating tool and designed to maintain overhead bearing on the work W while said tool is cutting, (see particularly Fig. V). This block 35 may be conveniently carried by straps 36 which are bent at their upper ends to engage over the top face of the head 19, and if desired may be moved therealong to adjust the member 35 towards and from the plane of the broach. In addition to its steadying relation to the work, the bearing member 35 also serves as a guard for the fingers of the operator in moving the work relative to said tool while the reciprocating tool is in operation.

The under or work-contacting face of the block is disposed slightly above the gauging point 21ª of the reciprocating tool, and so disposed permits free adjustment of the work relative to the broach, but when said tool is cutting into the work receives and prevents the tendency of the work to rise and fall under the successive cutting strokes of the broach.

Although I have illustrated my invention in its application to a saw trimmer of standard type, it will be understood that the principles involved are capable of embodiment in a unitary organization without regard to the machine for cutting the initial opening in the work. The double faced tool 21 cuts in both directions from the single opening made in the work and the work feed table 4 permits the work to be advanced to either cutting face of the tool. The hold down structure 35, 36, effectually prevents chatter of the work while the reciprocating tool is cutting. The arrangement is such moreover that the reciprocating tool is positively prevented from lifting above the work while cutting, thus avoiding the danger of breaking said tool. The stop 10 for limiting the vertical adjustment of the work elevating table 3 and the hold down block 35 are adapted to be so adjusted relatively as to bring the work in proper relation to the hold down. Where the invention is embodied as an attachment to a saw trimmer of standard type, the reciprocating tool 21 and the circular saw 14 are disposed in absolute alignment and the work elevating table 3 so functions as to elevate the work from the range of the circular saw into the range of the reciprocating tool at the will of the operator.

Various modifications in the construction and operation of my device may obviously be resorted to if within the limits of the appended claims.

What I therefore claim and desire to secure by Letters Patent is:

1. An attachment for a saw trimmer of the class described, comprising in combination with the saw and saw spindle thereof, a reciprocable cutting tool alined with said saw, and a drive from said saw spindle to said cutting tool including a coupling element for selectively connecting said tool with and disconnecting it from said saw spindle.

2. An attachment for a saw trimmer of the class described, comprising in combination with the saw and saw spindle thereof, a reciprocable cutting tool alined with said saw, and a drive from said saw spindle to said cutting tool including a reducing train, and a slidable gear for selectively connecting said tool with and disconnecting it from said saw spindle.

3. An attachment for a saw trimmer of the class described, comprising in combination with the saw and saw spindle thereof, a head pivotally mounted for movement into and out of operative relation to the saw, a cutting tool reciprocable in said head and alining with said saw, and a drive from said saw spindle to said cutting tool comprising a gear train and a slidable gear for selectively connecting said tool with and disconnecting it from said saw spindle.

4. The combination with a frame, a saw spindle and a saw, of a head pivotally mounted upon said frame, a tool spindle journaled in said head, a cutting tool reciprocably mounted upon said tool spindle for alinement with said saw, and a drive from said saw spindle to said tool spindle, including a pinion on each of said spindles, and an intermediate gear operatively connected with the pinion on said tool spindle and slidable into and out of mesh with the pinion on said saw spindle.

5. The combination with a frame, a saw spindle and a saw, of a head pivotally mounted upon said frame, a tool spindle journaled in said head, a cutting tool reciprocably mounted upon said tool spindle for alinement with said saw, and a drive from said saw spindle to said tool spindle, including a pinion on each of said spindles, an intermediate reducing gear meshing with the pinion on the tool spindle and a gear meshing with said reducing gear and slidable into and out of mesh with the pinion on said saw spindle.

6. The combination with a circular saw, of a reciprocable cutting tool alinable with said saw, and a drive from said saw to said tool, including an adjustable coupling element for selectively connecting and disconnecting said saw and tool.

7. The combination with a circular saw, of a reciprocable cutting tool alinable with said saw, and a drive from said saw to said tool, including a reducing train and a slidable gear for selectively connecting and disconnecting said saw and tool.

8. In combination, a frame, a saw spindle journaled therein, a saw, a head pivoted to said frame, a tool spindle journaled in said head, a crank on said tool spindle, a cutting tool connected with said crank and reciprocating in the line of cut of the saw, and a drive from said saw spindle to said tool spindle including a pinion on each spindle, and a gear slidable into and out of mesh with the saw spindle pinion and operatively connected with said tool spindle pinion.

9. In combination, a frame, a saw spindle journaled therein, a saw, a head pivoted to said frame, a tool spindle journaled in said head, a crank on said tool spindle, a cutting tool connected with said crank and reciprocating in the line of cut of the saw, and a drive from said saw spindle to said tool spindle including an adjustable element for selectively connecting said tool spindle with and disconnecting it from said saw spindle.

10. The combination with a circular saw, of a reciprocable cutting tool having cutting teeth, and an axial indexing point alining with said saw.

In testimony whereof I affix my signature in presence of two witnesses.

AMOS COLLINS.

Witnesses:
ELSIE F. DYER,
GEO. B. RAWLINGS.